(12) United States Patent
Lai et al.

(10) Patent No.: US 6,407,872 B1
(45) Date of Patent: Jun. 18, 2002

(54) OPTICAL PATH LENGTH SCANNER USING MOVING PRISMS

(75) Inventors: Ming Lai, Dublin; Jay Wei, Fremont; Manish D. Kulkarni, San Ramon; Kabir M. Arianta, Livermore, all of CA (US)

(73) Assignee: Carl Zeiss, Inc., Thornwood, NY (US)

( * ) Notice: Subject to any disclaimer, the term of this patent is extended or adjusted under 35 U.S.C. 154(b) by 0 days.

(21) Appl. No.: 09/784,834

(22) Filed: Feb. 16, 2001

(51) Int. Cl.⁷ .................................................. G02B 5/04
(52) U.S. Cl. ........................ 359/833; 211/213; 211/837
(58) Field of Search ................................. 359/831, 833, 359/837, 839, 663, 726, 730, 196, 308, 211, 213, 216, 208; 250/234, 235; 385/16–23; 356/345, 354

(56) References Cited

U.S. PATENT DOCUMENTS

| | | | |
|---|---|---|---|
| 5,255,114 A | * 10/1993 | Kessler ........................ 359/196 |
| 5,321,501 A | 6/1994 | Swanson et al. ............. 356/345 |
| 5,436,986 A | * 7/1995 | Tsai .............................. 385/15 |
| 5,459,570 A | 10/1995 | Swanson et al. ............ 356/345 |
| 5,784,186 A | 7/1998 | Wang et al. ................. 359/200 |
| 5,886,806 A | 3/1999 | Wang et al. ................. 359/216 |
| 5,907,423 A | 5/1999 | Wang et al. ................. 359/203 |
| 5,959,784 A | * 9/1999 | Seki et al. ................... 359/663 |
| 6,111,645 A | 8/2000 | Tearney et al. ............. 356/354 |
| 6,134,003 A | 10/2000 | Tearney et al. ............. 356/345 |
| 6,178,255 B1 | * 1/2001 | Scott et al. .................. 382/124 |

OTHER PUBLICATIONS

"400–Hz mechanical scanning optical delay line" by K.F. Kwong et al., *Optics Letters*, vol. 18, No. 7, Apr. 1, 1993, pp. 558–560.

"Rapid and scalable scans at 21 m/s in optical low–coherence reflectometry" by J. Ballif et al., *Optics Letters*, vol. 22, No. 11, Jun. 1, 1997, pp. 757–759.

"High–spped phase– and group–delay scanning with a grating–based phase control delay line" by G. J. Tearney et al., *Optics Letters*, vol. 22, No. 23, Dec. 1, 1997, pp. 1811–1813.

"Scanning delay line with a rotating–parallelogram prism for low–coherence interferometry" by L. Giniunas et al., *Applied Optics*, vol. 38, No. 34, Dec. 1, 1999, pp. 7076–7079.

* cited by examiner

*Primary Examiner*—Mohammad Sikder
(74) *Attorney, Agent, or Firm*—Michael B. Einschlag

(57) ABSTRACT

One embodiment of the present invention is an optical path length scanner which includes: (a) a set of prisms mounted evenly along a movable carrier; and (b) a mechanism that drives the movable carrier to move.

22 Claims, 4 Drawing Sheets

500

OPTICAL PATH LENGTH SCANNER USING MOVING PRISMS

TECHNICAL FIELD OF THE INVENTION

The present invention pertains to an optical device for scanning optical path length. In particular, the present invention relates to an optical device for scanning optical path length using a set of moving prisms.

BACKGROUND OF THE INVENTION

An optical path length scanner is an important component used in many applications including, for example and without limitation, optical auto-correlation applications, optical coherent tomography ("OCT"), and optical coherent domain reflectometer ("OCDR"), to name a few. Scanning amplitude, linearity, duty cycle, and repetition rate are key parameters used to determine the efficacy of optical path length scanners. For example, in many applications it is desirable to have simultaneously a large scanning amplitude (for example, >1 mm), good linearity (for example, >95%), a high duty cycle (for example, >75%), and a high repetition rate (for example, >200 Hz). In addition, compactness and simplicity are among further concerns that relate to manufacturing of an optical path length scanner.

FIG. 3 shows a conventional optical path length scanner 310 as it is commonly used in a conventional interferometer 300. As is well known, optical path length scanner 310 comprises retro-reflector 311 that is back and forth along a linear path with a driving mechanism such as, for example and without limitation, a galvanometer or a driven voice coil (the driving mechanism is not shown in FIG. 3).

As further shown in FIG. 3, radiation beam 325 is directed to impinge upon retro-reflector 311, and is reflected thereby to produce returning beam 328. As is well known by those of ordinary skill in the art, returning beam 328 is substantially parallel to incident beam 325, regardless of its alignment with respect to retro-reflector 311.

Limitations with prior art optical path length scanner 310 stem from difficulty in driving retro-reflector 311 in a back and forth motion. For example, one limitation of back-and-forth driving mechanisms is that the repetition rate is typically below a hundred hertz (100 Hz) if a scanning amplitude in the millimeter range is required. Another limitation of back-and-forth driving mechanisms is that good linearity can be obtained only for a small portion of a cycle.

Various other designs for optical path length scanners have been reported in the prior art. One example of another design relates to a scanning optical delay device having a helicoid reflecting mirror that is disclosed in U.S. Pat. Nos. 5,784,186; 5,886,806; and 5,907,423 (inventors Wang et al.). A further example of another design relates to a grating-based, phase control, optical delay line that is disclosed in U.S. Pat. No. 6,111,645 (inventor Tearney et al.). A still further example of another design relates to a scanning optical delay line comprised of a rotating-parallelogram prism that is disclosed in an article entitled "Scanning delay line with a rotating-parallelogram prism for low-coherence interferometry" by Giniunas et al. in *Applied Optics*, Vol. 38, No. 34, Dec. 1, 1999, pp. 7076–7079. A yet still further example of another design relates to a rapid depth scanner comprised of a rotating cube that is disclosed in an article entitled "Rapid and scalable scans at 21 m/s in optical low-coherence reflectometry" by Ballif et al. in *Optics Letters*, Vol. 22, No. 11, Jun. 1, 1997, pp. 757–759. However, none of these designs provide a practical optical path length scanner (i.e., an optical path length scanner having relatively low cost, having a long lifetime, and requiring little alignment) which has a repetition rate in the kilohertz range, and a scanning amplitude in the millimeter range with good linearity and a high duty cycle.

In light of the above, there is a need for an optical path length scanner capable of having a relatively high repetition rate (for example, up to the kilohertz range) and a scanning amplitude up to the millimeter range with good linearity and a relatively high duty cycle.

SUMMARY OF THE INVENTION

Embodiments of the present invention advantageously satisfy the above-identified need in the art, and provide an optical path length scanner. Specifically, in accordance with a first embodiment of the present invention, an optical path length scanner comprises: (a) a set of prisms mounted evenly along a movable carrier; and (b) a mechanism that drives the movable carrier to move. In addition, in accordance with a second embodiment of the present invention, the optical path length scanner further comprises a first prism held stationary relative to a predetermined direction and arranged in a complementary orientation and position with respect to the set of prisms. In further addition, in accordance with a third embodiment of the present invention, the optical path length scanner further comprises a mechanism that applies a beam of radiation at a minimum deviation angle of incidence to the prisms.

DETAILED DESCRIPTION

Figure 1:
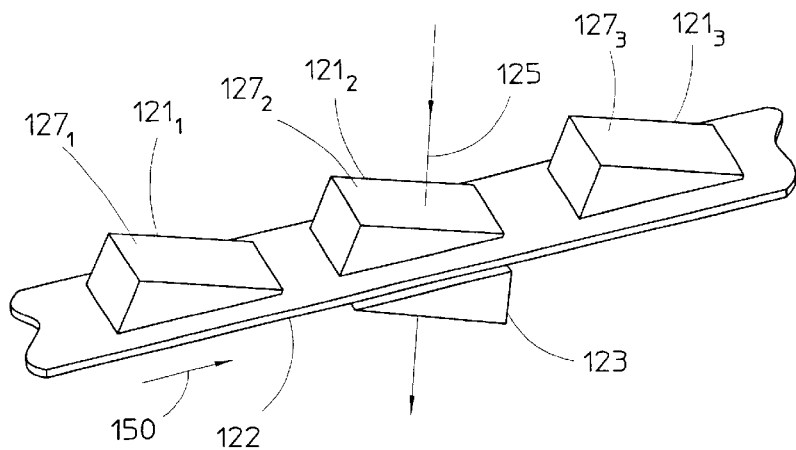
FIG. 1 shows a first embodiment of an optical path length scanner that is fabricate in accordance the present invention.

FIG. 1 shows optical path length scanner 100 which is fabricated in accordance with a first embodiment of the present invention. As shown in FIG. 1, optical path length scanner 100 comprises a set of substantially identical wedge prisms $121_i$ mounted evenly along movable belt 122 (where i refers to 1, 2, 3, and so on) with a wedge surface of each of prisms $121_i$ abutting belt 122. In accordance with this embodiment of the present invention, wedge prisms $121_i$ are aligned along a direction of motion of belt 122; the direction of motion being indicated by arrow 150. As further shown in FIG. 1, an additional prism, prism 123 is held in a holder (the holder is not shown for ease of understanding the present invention, but it may be fabricated in accordance with any one of a number of methods that are well known to those of ordinary skill in the art) so that prism 123 is stationary relative to belt 122. Prism 123 is substantially identical to prisms $121_i$, but it is mounted in a complementary orientation. This means that radiation beam 125 maintains substantially the same direction after it passes through any one of the set of prisms $121_i$ and prism 123 it had prior to impinging thereon.

As shown in FIG. 1, radiation beam 125 is projected to impinge upon belt 122 and prism 123. In accordance with this embodiment of the present invention, radiation beam 125 maintains substantially the same direction as it passes through any one of prisms $121_i$, belt 122, and prism 123. In a preferred embodiment, radiation beam 125 is incident approximately normal to wedge surface $127_i$ of wedge prisms $121_i$, and thus experiences substantially no lateral displacement.

In operation, as belt 122 moves in the direction indicated by arrow 150, prisms $121_i$ move across radiation beam 125, one after the other. If belt 122 moves at a substantially constant speed, the amount of material comprising prisms $121_i$ (for example, glass) that beam 125 passes through varies as a function of time substantially as a saw tooth function. As a result, the optical path length for radiation beam 125 that passes through optical path length scanner 100 varies substantially as a saw tooth function of time.

Belt 122 should be fabricated from a material that is substantially transparent to radiation beam 125. The term substantially transparent, as used in this context, refers to being sufficiently transparent with respect to power requirements of an application in which the optical path length scanner is used. Further, belt 122 can be fabricated from any sufficiently transparent material that has the strength to define a relatively flat surface while carrying and moving the prisms at a predetermined speed. The predetermined speed is that speed which suffices to produce a sufficient amount of optical path length excursion in an application in which the optical path length scanner is used. Still further, a source of radiation beam 125 depends on an application in which the optical path length scanner is used. For example, the source is typically a source of a collimated beam of radiation having a predetermined coherent length. Such sources may be fabricated in accordance with any one of a number of methods that are well known to those of ordinary skill in the art. One example of a suitable source comprises a laser, and another example of a suitable source comprises a super luminescent diode. Yet still further, prisms $121_i$ and prism 123 can be fabricated from any number of optical materials such as, for example and without limitation, PK7, fused silica, and sapphire. However, depending on an application in which the optical path length scanner is used, an optical material with minimal dispersion can be desirable. Such optical materials can be fabricated in accordance with any one of a number of methods that are well known to those of ordinary skill in the art by doping materials to minimize dispersion at predetermined wavelengths. In particular, relatively dispersion-free optical materials are available, for example, from Corning Glass Company of New York. Lastly, a mechanism to move belt 122 can comprise any one of a number of arrangements that are well known to those of ordinary skill in the art such as, for example and without limitation, an arrangement comprised of pulleys and a motor.

The useful duty cycle of optical path length scanner 100 is determined by a ratio of a length across a cross sectional area of beam 125 (the length is taken along the direction of motion indicated by arrow 150), and a length of each prism $121_i$ (the length is taken along the direction of motion indicated by arrow 150), assuming the gap between the prisms negligible. For a typical beam length of 1 mm, and a prism length of 20 mm, the duty cycle is approximately 95%. Advantageously, in accordance with this embodiment of the present invention, optical path length scanner 100 can produce a nearly perfect linearity over its useful duty cycle.

If one assumes a prism length of 20 mm, and a prism wedge angle of 20 degrees, prisms $121_i$ can introduce a 6 mm of change in the amount of material (for example, glass) that is seen by beam 125. This change is equivalent to an optical path length change (depending on index of refraction of the prism material) of about 3 mm for a typical glass. Further, if one assumes a speed of motion of belt 122 of 20 m/s, scanner 100 can produce a scanning rate of 1 kHz.

Figure 2:
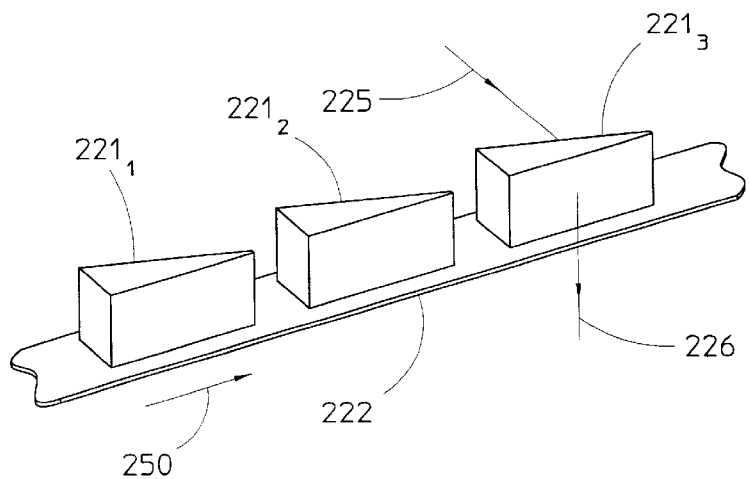
FIG. 2 shows a second embodiment of an optical path length scanner that is fabricated in accordance the present invention.

FIG. 2 shows optical path length scanner 200 which is fabricated in accordance with a second embodiment of the present invention. As shown in FIG. 2, optical path length scanner 200 comprises a set of substantially identical wedge prisms $221_i$ mounted evenly along movable belt 222 (where i refers to 1, 2, 3, and so on) with wedge surfaces of each of prisms $221_i$ being substantially normal to belt 222. In accordance with this embodiment of the present invention, wedge prisms $221_i$ are aligned along a direction of motion of belt 222, the direction of motion being indicated by arrow 250. As shown in FIG. 2, radiation beam 225 is projected to impinge upon a wedge surface of prism $221_i$ at a minimum deviation angle. At the minimum deviation angle, as is well known to those of ordinary skill in the art, a beam path of transmitted beam 226 and a beam path of incident beam 225 are symmetric with respect to a symmetry plane of prism $221_i$. At such a minimum deviation angle incidence, the direction of the beam path of transmitted beam 226 remains unchanged as prism $221_i$ moves in a direction in its symmetry plane. Advantageously, in accordance with this embodiment of the present invention, the direction of the beam path of transmitted beam 226 is not sensitive to small deviations of orientation of prisms $221_i$, which deviations may occur as belt 222 moves.

In operation, as belt 222 moves in the direction indicated by arrow 250 (the direction indicated by arrow 250 lies substantially in the symmetry plane of prisms $221_i$, at least over a distance where beam 225 passes therethrough), prisms $221_i$ move across radiation light beam 225, one after the other. If belt 222 moves at a substantially constant speed, the amount of material comprising prisms $221_i$ (for example, glass) that beam 225 passes through varies as a function of time substantially as a saw tooth function. As a result, the optical path length for radiation beam 225 that passes through optical path length scanner 200 varies substantially as a saw tooth function of time.

Belt 222 can be fabricated from any material that has the strength to define a relatively flat surface while carrying and moving the prisms at a predetermined speed. The predetermined speed is that speed which suffices to produce a sufficient amount of optical path length excursion in an application in which the optical path length scanner is used. One example, and without limitation of such a material is a rubber belt. Further, a source of radiation beam 225 depends on an application in which the optical path length scanner is used. For example, the source is typically a source of a collimated beam of radiation having a predetermined coherent length. Such sources may be fabricated in accordance with any one of a number of methods that are well known to those of ordinary skill in the art. One example of a suitable source comprises a laser, and another example of a suitable source comprises a super luminescent diode. Still further, prisms $221_i$ can be fabricated from any number of optical materials such as, for example and without limitation, PK7, fused silica, and sapphire. However, depending on an application in which the optical path length scanner is used, an optical material with minimal dispersion can be desirable. Such optical materials can be fabricated in accordance with any one of a number of methods that are well known to those of ordinary skill in the art by doping materials to minimize dispersion at predetermined wavelengths. Lastly, a mechanism to move belt 222 may be fabricated in the same manner described above for the mechanism to move belt 122.

The useful duty cycle of optical path length scanner 200 is determined by a ratio of a length across a cross sectional area of beam 225 (the length is taken along the direction of motion indicated by arrow 250), and a length of each prism $221_i$ (the length is taken along the direction of motion indicated by arrow 250), assuming the gap between the prisms negligible. For a typical beam length of 1 mm, and a prism length of 20 mm, the duty cycle is approximately 95%. Advantageously, in accordance with this embodiment of the present invention, and similar to optical path length scanner 100, optical path length scanner 200 can produce a nearly perfect linearity over its useful duty cycle.

If one assumes a prism length of 20 mm, and a prism wedge angle of 20 degree, prisms $221_i$ can introduce a 6 mm change in the amount of material (for example, glass) that is seen by beam 225. This change is equivalent to an optical path length change (depending on index of refraction of the prism material) of about 3 mm for a typical glass. Further, if one assumes a speed of motion of belt 222 of 20 m/s, scanner 200 can produce a scanning rate of 1 kHz.

Figure 3:
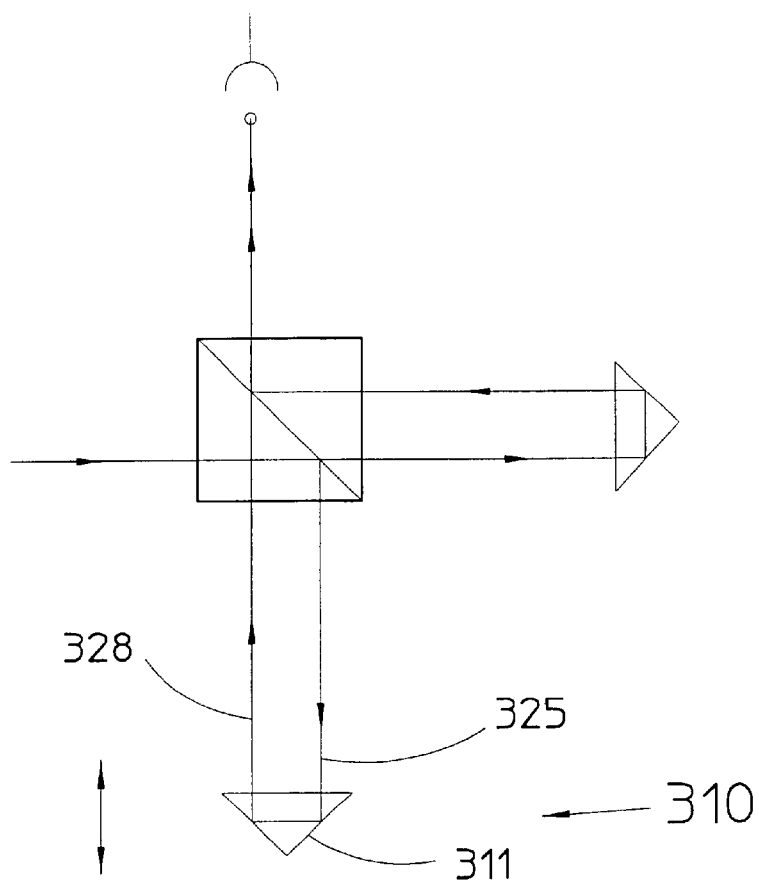
FIG. 3 shows a conventional optical path length scanner as it is commonly used in a conventional interferometer.
Figure 4:
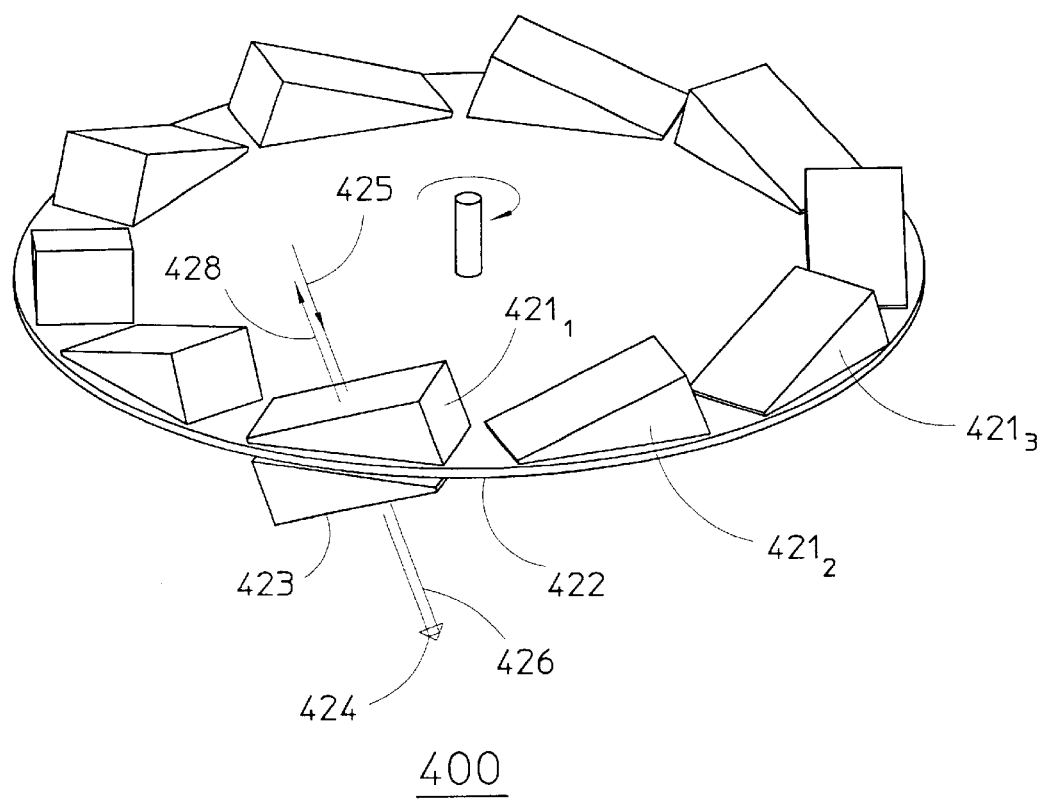
FIG. 4 shows a third embodiment of an optical path length scanner that is fabricated in accordance with the present invention.

FIG. 4 shows optical path length scanner 400 which is fabricated in accordance with a third embodiment of the present invention. Optical path length scanner 400 can replace optical path length scanner 310 in interferometer 300 shown in FIG. 3.

As shown in FIG. 4, optical path length scanner 400 comprises: (a) prism 423; (b) a set of substantially identical wedge prisms $421_i$ mounted evenly on a rotatable wheel 422 (where i refers to 1, 2, 3, and so on) with a wedge surface of each of prisms $421_i$ abutting rotatable wheel 422; and (c) retro-reflector 424.

In accordance with this embodiment of the present invention, wedge prisms $421_i$ are mounted along a circle on rotatable wheel 422. As further shown in FIG. 4, prism 423 is held in a holder (the holder is not shown for ease of understanding the present invention, but it may be fabricated in accordance with any one of a number of methods that are well known to those of ordinary skill in the art) so that prism 423 is stationary relative to rotatable wheel 422. Prism 423 is substantially identical to prisms $421_i$, but it is mounted in a complementary orientation. This means that radiation beam 425 maintains substantially the same direction after it passes through any one of the set of prisms $421_i$ and prism 423 it had prior to impinging thereon.

As further shown in FIG. 4, retro-reflector 424 produces returning beam 428. In accordance with this embodiment of the present invention, there are three advantages resulting from use of retro-reflector 424: (a) its use makes optical path length scanner 400 a simple replacement for optical path length scanner of 310 in interferometer 300 shown in FIG. 3; (b) its use doubles the optical path length modulation induced by moving prisms $421_i$; and (c) its use makes the alignment of prism 423 and prisms $421_i$ less critical.

In operation, as rotatable wheel 422 rotates, prisms $421_i$ move across radiation beam 425, one after the other. If a circle on rotatable wheel 422 at which prisms $421_i$ are mounted moves at a substantially constant speed, the amount of material comprising prisms $421_i$ (for example, glass) that beam 425 and its returning beam 428 pass through varies as a function of time substantially as a saw tooth function. As a result, the optical path length for beam 425 and its returning beam 428 that pass through optical path length scanner 400 varies substantially as a saw tooth function of time.

A small deviation from perfect linearity is expected for optical path length scanner 400 due to the circular motion of rotatable wheel 422. Despite this, however, optical path length scanner 400 can produce good linearity if the perimeter of the circle at which prisms $421_i$ are mounted is much longer than the length of each prism $421_i$ (i.e., length perpendicular to the radius of the circle). For example, if one assumes the perimeter is 20 times as long as the length of prism $421_i$, the deviation from perfect linearity is only about 1%.

In addition, a small variation in pointing direction is also expected for transmitted beam 426 because the orientational alignment between each one of the set of prisms $421_i$ and prism 423 varies due to rotation of rotatable wheel 422. Despite this, however, the pointing direction of returning beam 428 remains substantially unaffected because of the use of retro-reflector 424.

Rotatable wheel 422 can be fabricated from a material that is substantially transparent to radiation beam 425. The term substantially transparent, as used in this context, refers to being sufficiently transparent with respect to power requirements of an application in which the optical path length scanner is used. Further, wheel 422 can be fabricated from any sufficiently transparent material that has the strength to define a relatively flat surface while carrying and moving the prisms at a predetermined speed. The predetermined speed is that speed which suffices to produce a sufficient amount of optical path length excursion in an application in which the optical path length scanner is used. Still further, a source of radiation beam 425 depends on an application in which the optical path length scanner is used. For example, the source is typically a source of a collimated beam of radiation having a predetermined coherent length. Such sources may be fabricated in accordance with any one of a number of methods that are well known to those of ordinary skill in the art. One example of a suitable source comprises a laser, and another example of a suitable source comprises a super luminescent diode. Yet still further, prisms $421_i$ and prism 423 can be fabricated from any number of optical materials such as, for example and without limitation, PK7, fused silica, and sapphire. However, depending on an application in which the optical path length scanner is used, an optical material with minimal dispersion can be desirable. Such optical materials can be fabricated in accordance with any one of a number of methods that are well known to those of ordinary skill in the art by doping materials to minimize dispersion at predetermined wavelengths. In particular, relatively dispersion-free optical materials are available, for example, from Corning Glass Company of New York. Lastly, a mechanism to move wheel 422 comprises any one of a number of apparatus that are well known to those of ordinary skill in the art such as, for example and without limitation, a rotating motor.

The useful duty cycle of optical path length scanner 400 depends on a length across a cross sectional area of beam 425 (the length is taken along a direction perpendicular to a radius of the circle where beam 425 impinges upon rotatable wheel 422), a length of each prism $421_i$, (the length is taken along a direction perpendicular to a radius of the circle where beam 425 impinges upon rotatable wheel 422), and a length of the gap between successive ones of prisms $421_i$. For a typical beam length of 1 mm, a prism length of 20 mm, and a gap length of 1 mm, the duty cycle is approximately 90%. If one assumes a prism length of 20 mm, and a prism wedge angle of 20 degrees, prisms $421_i$ can introduce a 6 mm change in the amount of material (for example, glass) that is seen by beam 425. This is equivalent to an optical path length change (depending on index of refraction of the prism material) of about 3 mm for a typical glass. The total optical path length modulation is thus 6 mm in a double pass. Further, if one assumes a speed of rotation of rotatable wheel 422 of 50 cycles/s, optical path length scanner 400 can produce a scanning rate of 1 kHz.

Figure 5:
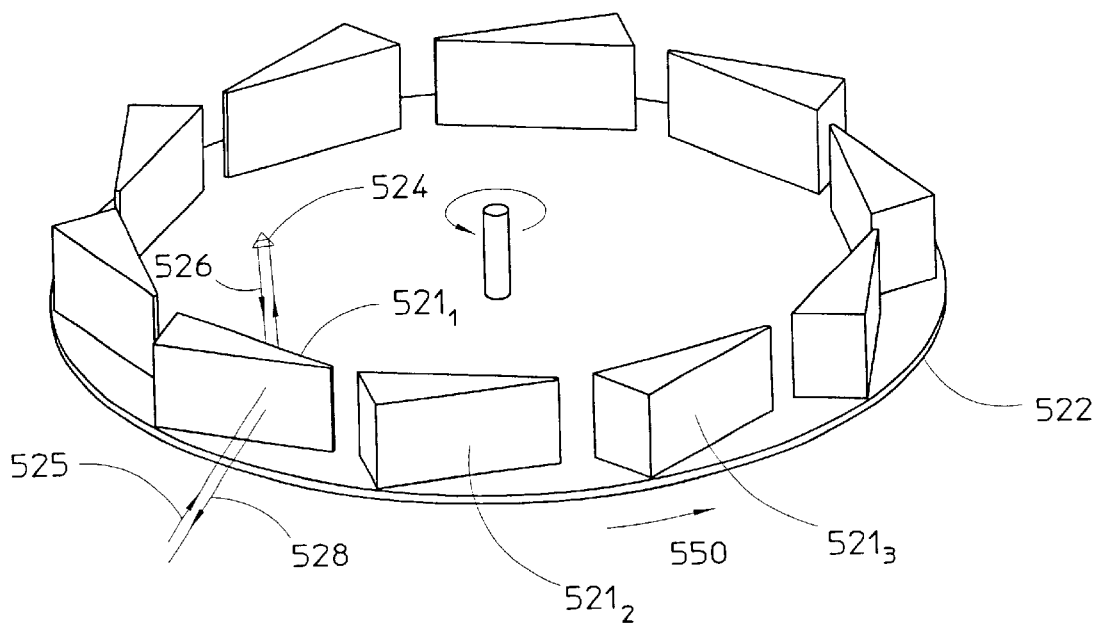
FIG. 5 shows a fourth embodiment of an optical path length scanner that is fabricated in accordance with the present invention.

FIG. 5 shows optical path length scanner 500 which is fabricated in accordance with a fourth embodiment the present invention. Optical path length scanner 500 can replace optical path length scanner 310 in interferometer 300 shown in FIG. 3.

As shown in FIG. 5, optical path length scanner 500 comprises: (a) a set of substantially identical wedge prisms $521_i$ mounted evenly on a rotation wheel 522 (where i refers to 1, 2, 3, and so on) wherein the wedge surfaces of each of prisms $221_i$ are substantially normal to rotatable wheel 522; and (b) retro-reflector 524. In accordance with this embodiment of the present invention, wedge prisms 521 are aligned along a direction of motion of rotatable wheel 522, the direction of motion being indicated by arrow 550.

As further shown in FIG. 5, radiation beam 525 is projected to impinge upon a wedge surface of prism $521_i$ at a minimum deviation angle. At the minimum deviation angle, as is well known to those of ordinary skill in the art, a beam path of transmitted beam 526 and a beam path of incident beam 525 are symmetric with respect to a symmetry plane of prism $521_i$. At such a minimum deviation angle incidence, the direction of the beam path of transmitted beam 526 remains unchanged as prism $521_i$ moves in a direction in its symmetry plane. As shown in FIG. 5, retro-reflector 524 produces returning beam 528.

In accordance with this embodiment of the present invention, an advantage occurs in that the pointing direction of transmitted beam 526 is not sensitive to small deviations in orientation of the prisms, which deviations may occur as rotatable wheel 522 moves. In addition, there are three additional advantages resulting from use of retro-reflector 524: (a) its use makes scanner 500 a simple replacement for scanner of 310 in interferometer 300 shown in FIG. 3; (b) its use doubles the optical path length modulation induced by moving prisms $521_i$; and (c) its use makes the alignment of prisms $521_i$ much less critical.

In operation, as rotatable wheel 522 rotates, prisms $521_i$ move across radiation beam 525, one after the other (the direction indicated by arrow 550 lies substantially in the symmetry plane of prisms $521_i$, at least over a distance where beam 525 passes therethrough). If a circle on rotatable wheel 522 at which prisms $521_i$ are mounted moves at a substantially constant speed, the amount of material comprising prisms $521_i$ (for example, glass) that beam 525 and its returning beam 528 pass through varies as a function of time substantially as a saw tooth function. As a result, the optical path length for beam 525 and its returning beam 528 that pass through optical path length scanner 500 varies substantially as a saw tooth function of time.

A small deviation from perfect linearity is expected for optical path length scanner 500 due to the circular motion of rotation wheel 522. Despite this, however, optical path length scanner 500 can produce good linearity if the perimeter of the circle at which prisms $521_i$ are mounted is much longer than the length of each prism $521_i$ (i.e., a length perpendicular to a radius of the circle).

Rotatable wheel 522 can be fabricated from any material that has the strength to define a relatively flat surface while carrying and moving the prisms at a predetermined speed. The predetermined speed is that speed which suffices to produce a sufficient amount of optical path length excursion in an application in which the optical path length scanner is used. One example, and without limitation of such a material is aluminum. Further, a source of radiation beam 525 depends on an application in which the optical path length scanner is used. For example, the source is typically a source of a collimated beam of radiation having a predetermined coherent length. Such sources may be fabricated in accordance with any one of a number of methods that are well known to those of ordinary skill in the art. One example of a suitable source comprises a laser, and another example of a suitable source comprises a super luminescent diode. Still further, prisms $521_i$ can be fabricated from any number of optical materials such as, for example and without limitation, PK7, fused silica, and sapphire. However, depending on an application in which the optical path length scanner is used, an optical material with minimal dispersion can be desirable. Such optical materials can be fabricated in accordance with any one of a number of methods that are well known to those of ordinary skill in the art by doping materials to minimize dispersion at predetermined wavelengths. In particular, relatively dispersion-free optical materials are available, for example, from Corning Glass Company of New York. Lastly, a mechanism to move wheel 522 comprises any one of a number of apparatus that are well known to those of ordinary skill in the art such as, for example and without limitation, a rotating motor.

Comparing optical path length scanners 400 and 500, optical path length scanner 500 has a slightly larger deviation from perfect linearity. However, the variation of the pointing direction of transmitted beam 526 is much smaller than that of transmitted beam 426. The pointing direction of returning beam 528 is further improved by the use of the retro-reflector 524.

The useful duty cycle of optical path length scanner 500 depends a length across a cross sectional area of beam 525 (the length is taken along a direction perpendicular to a radius of the circle where beam 525 impinges upon prisms $521_i$), a length of each prism $521_i$ (the length is taken along a direction perpendicular to a radius of the circle where beam 525 impinges upon prisms $521_i$), and a length of the gap between successive ones of prisms $521_i$. For a typical beam length of 1 mm, a prism length of 20 mm, and a gap of 1 mm, the duty cycle is approximately 90%. If one assumes a prism length of 20 mm, and a wedge angle of 20 degrees, prisms $521_i$ can introduce a 6 mm change in the amount of material (for example, glass) that is seen by beam 525. This is equivalent to an optical path length change (depending on index of refraction of the prism material) of about 3 mm for a typical glass. The total optical path length modulation is thus 6 mm in a double pass. Further, if one assumes a speed of rotation of rotation wheel 522 of 50 cycles/s, optical path length scanner 500 can produce a scanning rate of 1 kHz.

Those skilled in the art will recognize that the foregoing description has been presented for the sake of illustration and description only. As such, it is not intended to be exhaustive or to limit the invention to the precise form disclosed.

What is claimed is:

1. An optical path length scanner comprising:
   a set of radiation transmitting prisms mounted evenly along a movable carrier; and
   a mechanism that drives the movable carrier to move, wherein an optical path length of radiation is scanned when the radiation is transmitted by at least one of the prisms as the carrier moves.

2. The optical path length scanner of claim 1 which further comprises a first prism held stationary relative to a predetermined direction and arranged in a complementary orientation and position with respect to the set of prisms.

3. The optical path length scanner of claim 1 wherein the mechanism drives the movable carrier to move at a substantially constant rate.

4. The optical path length scanner of claim 2 wherein the first prism and the set of prisms are substantially identical prisms.

5. The optical path length scanner of claim 2 wherein the first prism and the set of prisms are wedge prisms.

6. The optical path length scanner of claim 1 wherein the movable carrier comprises a belt.

7. The optical path length scanner of claim 1 wherein the movable carrier comprises a rotatable wheel.

8. The optical path length scanner of claim 1 which further comprises a mechanism that applies a beam of radiation at a minimum deviation angle of incidence to the prisms.

9. The optical path length scanner of claim 1 wherein the set of prisms are substantially identical prisms.

10. The optical path length scanner of claim 1 wherein the set of prisms are wedge prisms.

11. The optical path length scanner of claim 2 which further comprises a retro-reflector disposed to reflect a beam of radiation incident substantially along the predetermined direction.

12. The optical path length scanner of claim 11 wherein the first prism and the set of prisms are substantially identical prisms.

13. The optical path length scanner of claim 11 wherein the first prism and the set of prisms are wedge prisms.

14. The optical path length scanner of claim 11 wherein the movable carrier comprises a belt.

15. The optical path length scanner of claim 11 wherein the movable carrier comprises a rotatable wheel.

16. The optical path length scanner of claim 1 which further comprises a retro-reflector disposed to reflect a beam of radiation transmitted through the prisms.

17. The optical path length scanner of claim 16 wherein the mechanism drives the movable carrier to move at a substantially constant rate.

18. The optical path length scanner of claim 16 which further comprises a mechanism that applies a beam of radiation at a minimum deviation angle of incidence to the set of prisms.

19. The optical path length scanner of claim 16 wherein the set of prisms are substantially identical prisms.

20. The optical path length scanner of claim 16 wherein the set of prisms are wedge prisms.

21. The optical path length scanner of claim 16 wherein the movable carrier comprises a belt.

22. The optical path length scanner of claim 16 wherein the movable carrier comprises a rotatable wheel.

* * * * *